United States Patent
Vytla (10) Patent No.: US 10,659,301 B2
(45) Date of Patent: May 19, 2020

(54) CONFIGURING CONTAINER ATTRIBUTE DATA ON NETWORK SWITCHES TO ENABLE NETWORKING FUNCTIONALITY

(71) Applicant: Cisco Technology, Inc., San Jose, CA (US)

(72) Inventor: Mouli Vytla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/112,322

(22) Filed: Aug. 24, 2018

(65) Prior Publication Data

US 2020/0067763 A1 Feb. 27, 2020

(51) Int. Cl.
*H04L 12/24* (2006.01)
*H04L 12/947* (2013.01)

(52) U.S. Cl.
CPC ............ *H04L 41/082* (2013.01); *H04L 49/25* (2013.01)

(58) Field of Classification Search
CPC ............................. H04L 41/082; H04L 49/25
See application file for complete search history.

(56) References Cited

U.S. PATENT DOCUMENTS

| | | | |
|---|---|---|---|
| 7,738,457 B2 | 6/2010 | Nordmark et al. | |
| 9,392,010 B2 | 7/2016 | Friedman et al. | |
| 9,521,115 B1 | 12/2016 | Woolward | |
| 9,893,995 B1 | 2/2018 | Sharma et al. | |
| 2012/0096185 A1* | 4/2012 | Naparstek | H04L 41/145 709/246 |
| 2013/0272181 A1* | 10/2013 | Fong | H04W 72/044 370/311 |
| 2017/0220334 A1* | 8/2017 | Hart | G06F 8/65 |
| 2018/0349033 A1* | 12/2018 | Kapadia | H04L 51/12 |

OTHER PUBLICATIONS

Rancher.com, "Rancher 1.6 Docs", dated 2017, 9 pages.

\* cited by examiner

*Primary Examiner* — Duc C Ho
(74) *Attorney, Agent, or Firm* — Merchant & Gould P.C.

(57) ABSTRACT

An approach enables networking functionality to be configured at network switches for containers hosted by computing devices. A container supervisor on the network switch is configured to obtain, via a container network manager, container attribute data for containers hosted by the computing devices. The container network manager is configured to interact with and manage container orchestration engines on behalf of the containers. This allows the network switch to be container orchestration agnostic. The network switch enables networking functionality for the containers by updating container configuration data on the networking switch based upon the container attribute data obtained from the container network manager. This may include, for example, updating hardware tables on the network switch with the container attribute data to allow the network switch, and applications executing on the network switch, to perform networking functionality with respect to the containers.

20 Claims, 6 Drawing Sheets

| Container Name | Container Label | Interface | VLAN | IP Address | Internal Port | External Port |
|---|---|---|---|---|---|---|
| C1 | APP | e1/2 | 100 | 10.10.1.2 | 8001 | 4000 |
| C2 | APP | e2/2 | 200 | 20.10.1.2 | 8002 | 5000 |
| C3 | WEB | e3/2 | 300 | 30.10.1.2 | 80 | 6000 |

FIG. 5
500

| Interface | VLAN | IP Address | Internal Port | External Port |
|-----------|------|------------|---------------|---------------|
| e1/2      | 100  | 10.10.1.2  | 8001          | 4000          |
| e2/2      | 200  | 20.10.1.2  | 8002          | 5000          |

FIG. 6
600

602 — Network switch application is instantiated and configured

604 — Network switch application obtains current container attribute data from the container supervisor 606 — Network switch application receives current container attribute data updates its local data with the current container attribute data 608 — Network switch application generates and/or modifies ACLs, service policies using the current container attribute data 610 — Complete application configuration with the ACLs, service policies, etc., and apply the policy on the interface 612 — Network switch applications begin using the current container attribute data

CONFIGURING CONTAINER ATTRIBUTE DATA ON NETWORK SWITCHES TO ENABLE NETWORKING FUNCTIONALITY

FIELD

Embodiments relate generally to networking, and more specifically, to managing container attribute data on network switches.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A software/application container ("container") is a type of Operating System (OS)-level virtualization technique that allows an application and its dependencies to run as resource-isolated processes. That is, a container is a lightweight, stand-alone, executable package that includes everything needed to run the software, including code, runtime, system tools, system libraries, settings, etc. Unlike Virtual Machines (VM), containers have no need for embedded operating systems and calls are made for operating system resources via an Application Program Interface (API).

The lightweight and portability properties of containers make them well suited for deploying many different types of services, such as microservices, in networks. For example, container-based micro-services are being widely adopted in the Data Center/Cloud Industry where, rather than building a single large, monolithic application, the container-based micro-services split the application into a set of smaller interconnected services.

One of the issues with using containers in computer networks is that containers are decoupled from physical computer networks and network switches are not container aware, and therefore must be manually configured to enable networking functionality. This must be done for each new container after deployment and anytime container attribute values are changed, for example, after container IP address or port number is changed, which is burdensome and prone to errors.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the various embodiments. It will be apparent, however, to one skilled in the art that the embodiments may be practiced without these specific details. In other instances, well-known structures and devices are shown in block diagram form to avoid unnecessarily obscuring the embodiments. Various aspects of embodiments are described hereinafter in the following sections:

I. Overview
II. Container Architecture
III. Obtaining Container Attribute Data Via Container Lifecycle Notifications
IV. Updating Network Switch Configuration Data
V. Using Container Attribute Data
VI. Implementation Examples

I. Overview

An approach enables networking functionality to be configured at network switches for containers hosted by computing devices. Container supervisors on network switches are configured to obtain, via a container network manager, container attribute data for containers hosted by the computing devices. The container network manager is configured to interact with, and manage, container orchestration engines on behalf of the network switches. This allows the network switches to be container orchestration agnostic, meaning that the network switches do not need the capability to interact directly with the container orchestration engines. The network switches enable networking functionality for the containers by updating container configuration data on the networking switches based upon the container attribute data obtained from the container network manager. This may include, for example, updating various hardware tables on the network switch with the container attribute data to allow the network switch, and applications executing on the network switch, to perform networking functionality with respect to the containers. The network functionality may include, for example, network traffic management, policy-based routing, security including access management using Access Control Lists (ACLs), providing different levels of quality of service, etc.

The approach reduces the amount of manual labor, e.g., hard coding, required to configure networking functionality on network switches for both new and existing containers. For example, container networking information, such as IP addresses, port numbers, and interfaces, as well as ACLs, do not have to be manually configured on network switches. In addition, the approach allows applications on network switches to be independent of container-specific network configuration data, such as IP address, port number, and interface, and multiple containers may be grouped for application processing based a common container attribute, such as a container label. The approach also dynamically updates container configuration data over time in response to changes made to container attribute data.

II. Container Architecture

Figure 1:
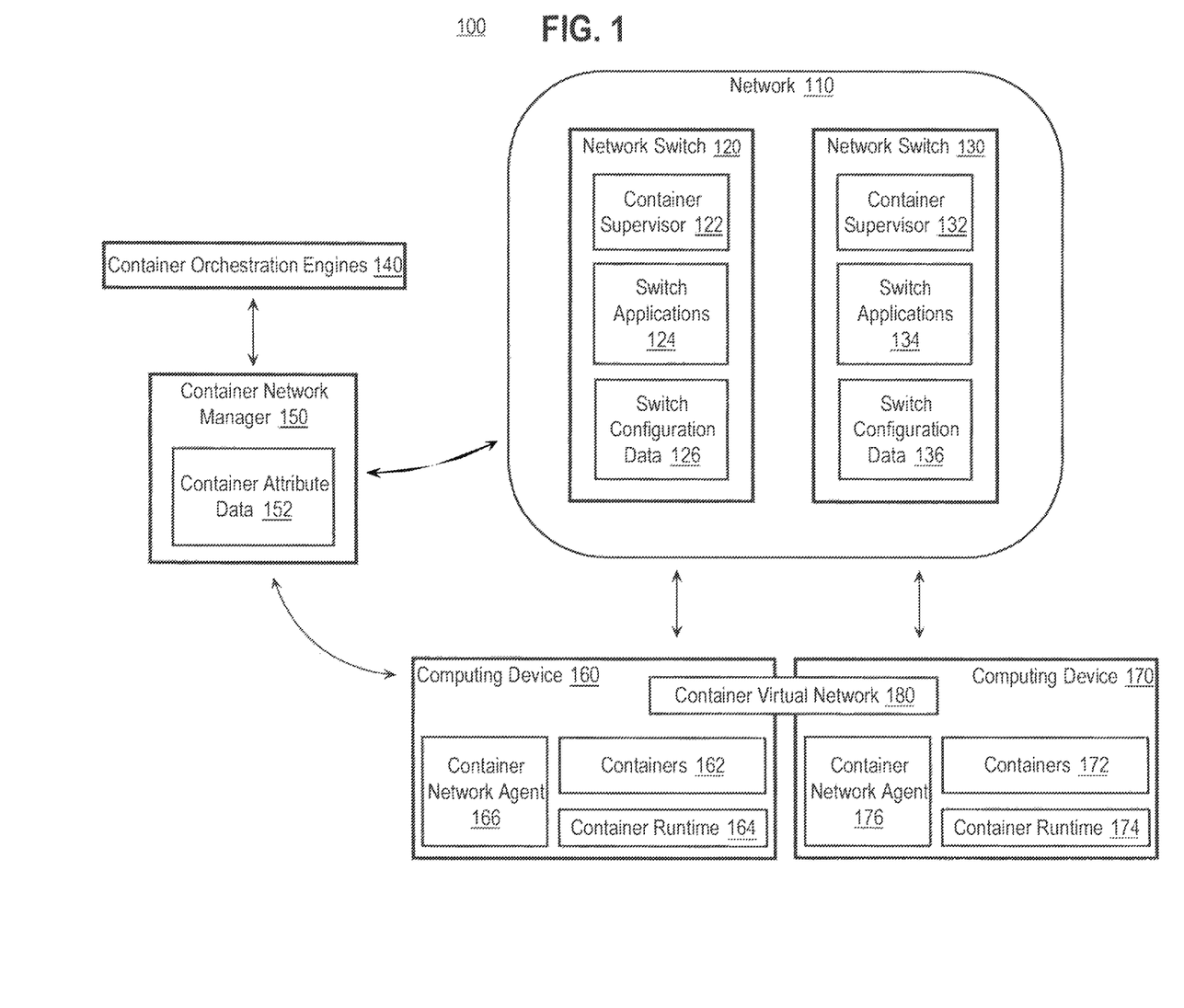
FIG. 1 depicts an example arrangement for enabling networking functionality to be configured at network switches for containers hosted by computing devices.

FIG. 1 depicts an example arrangement 100 on which the approaches described herein for enabling networking functionality to be configured at network switches for containers hosted by computing devices may be implemented. Arrangement 100 includes a network 110 with network switches 120, 130, container orchestration engines 140, a container network manager 150, and Computing devices 160, 170.

A. Network Switches

Network 110 includes network switches 120, 130 that may comprise, for example, leaf nodes in a leaf layer of a leaf and spine architecture, e.g., a CLOS network topology, although embodiments are not limited to this example are applicable to any network topology that employs network switches. In addition, although the arrangement 100 includes two network switches 120, 130 for purposes of explanation, embodiments are not limited to two network switches 120, 130, and network 110 may include any number of network switches of any type, and any number and type of other network elements.

In the example depicted in FIG. 1, network switches 120, 130 each include a container supervisor 122, 132, one or more switch applications 124, 134, and switch configuration data 126, 136, respectively. Network switches 120, 130 may include various other computer hardware elements, firmware elements, software elements, and/or any combination of computer hardware elements, firmware elements, and software elements, depending upon a particular implementation. For example, network switches 120, 130 may each include one or more processors, one or more memories, an operating system, other processes, etc.

Container supervisors 122, 132 implement the functionality described in more detail hereinafter for enabling container networking functionality at network switches. Switch applications 124, 134 may include any type of network switch application. Examples of switch applications 124, 134 include, without limitation, a network monitoring application, a policy-based routing application, etc. Switch applications 124 may include on switch operating system level applications.

Switch configuration data 126, 136 may include any type of data used by network switches 120, 130, or their constituent hardware, firmware, and/or software elements, to perform their respective functions. Examples of switch configuration data 126, 136 include, without limitation, any type of table data, such as forwarding table data, routing table data, access control list data, application configuration data, etc.

Figure 2:
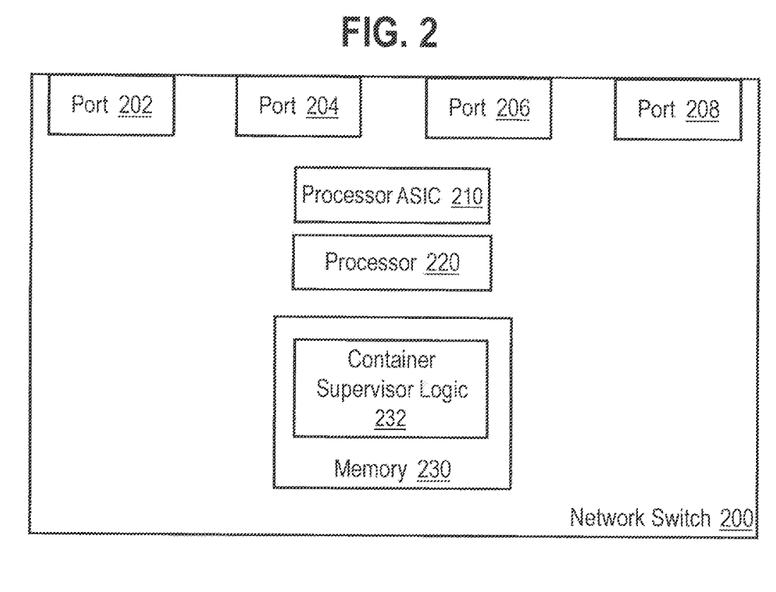
FIG. 2 is a block diagram of an example network switch.

FIG. 2 is a block diagram of an example implementation of network switches 120, 130 in the form of a network switch 200 that is configured to implement the techniques described herein. Network switch 200 includes a network interface in the form of a plurality of network ports 202-208 that enable communications over a network, a processor Application Specific Integrated Circuit (ASIC) 210 that performs network processing functions, one or more processors 220 (e.g., microprocessors or microcontrollers), and a memory 230. The memory 230 stores, among other elements, container supervisor logic 232. According to one embodiment, network device 200 is a virtual (software-based) appliance. Memory 230 may include read only memory (ROM), random access memory (RAM), magnetic disk storage media devices, optical storage media devices, flash memory devices, electrical, optical, or other physical/tangible memory storage devices. Thus, in general, memory 230 may comprise one or more tangible (non-transitory) computer-readable storage media (e.g., a memory device) encoded with software comprising computer executable instructions which, when processed by the one or more processors 220, causes the operations described herein with reference to network switches 120, 220 and more specifically. In particular, container supervisor logic 232 may enable network device 200 to perform the operations described herein with reference container supervisors 122, 132.

B. Computing Devices

Computing devices 160, 170 may be any type of computing device that is configurable to host one or more containers 162, 172, a container runtime 164, 174, and a container network agent 166, 176, respectively. An example of computing devices 160, 170 includes, without limitation, a server. Containers 162, 172 may include any number and types of containers. One non-limiting of a container is a Docker container, but embodiments are not limited to Docker containers. Each of the containers 162, 172 are stand-alone executable software packages that provide particular services and include everything needed to run the software package, including code, runtime, system tools, system libraries, settings, etc. Each container runtime 164, 174 is a basic container software layer that is configured to manage their respective containers 162, 172 on their respective computing device 160, 170 including, without limitation, managing container lifecycle events such as spawn, start, stop, delete, etc.

Each container network agent 166, 176 may implement a Container Network Interface (CNI) networking model or a Container Network Model (CNM) adopted by popular container orchestration engines to perform local programming, i.e., to program the respective computing device 160, 170. Each container network agent 166, 176 also communicates with the container network manager 150 via, for example, a Representational State Transfer (REST) Interface or a Remote Procedure Call (RPC) interface.

C. Container Orchestration Engines

Container orchestration engines 140 may be any number and type of container orchestration engines that may vary depending upon a particular implementation, and embodiments are not limited to any particular number or type of container orchestration engines. Example container orchestration engines include, without limitation, orchestration engines provided by Docker, Kubernetes, Mesos, etc. Container orchestration engines 140 operate with container network manager 150 and container network agents 166, 176, which collectively may be comprise a plug-in, to instantiate and manage containers 162, 172 on computing devices 160, 170, respectively. Container orchestration engines 140 allocate appropriate computing resources to containers 162, 172, while container network manager 150 and container network agents 166, 176 provide networking to containers 162, 172. Container network manager 150 and container network agents 166, 176 may support both the container network model (e.g., Docker networking Architecture) and Container Network Interface (e.g., CoreOS, the Kubernetes networking architecture) and may have L2, L3 (e.g., BGP), Overlay (e.g., VXLAN), and Application Centric Infrastructure (ACI) modes. Container orchestration engines 140 may communicate with container network manager using, for example, REST.

D. Container Network Manager

Container network manager 150 is a central entity that acts as resource manager that provides resource allocation of IP addresses, VLAN and VXLAN IDs for networks, and learns routes, for computing devices 160, 170. Container network manager 150 obtains and distributes container attribute data to container network agents 166, 176. According to one embodiment, container network manager 150 provides REST Application Programming Interface (API) server services to handle multiple requests simultaneously.

Container orchestration engines 140 may be of different types that implement different mechanisms for instantiating and managing containers. In conventional arrangements, network switches may interoperate with all of the different types of container orchestration engines 140, which increases overhead and makes the network switches difficult to extend, manage, and maintain over time, particularly as the scale of the containerization increases within a specific network. For example, a large number of notifications may adversely affect the performance of a network switch.

Container network manager 150 is configured to interact with and manage container orchestration engines 140 on behalf of network switches containers. This may include, for example, performing IP address management of containers 162, 172, providing per-tenant Domain Name System (DNS) services, etc. This allows network switches 120, 130 to be container orchestration agnostic, i.e., network switches 120, 130 do not have to have the capability to interact directly with container orchestration engines 140. This reduces overhead, including reducing computing and storage resources, and improves container scalability on network switches 120, 130.

According to an embodiment container network manager 150 is configured to detect the occurrence of container lifecycle events associated with containers 162, 172. Examples of container lifecycle events include, without limitation, container spawn, start, stop, delete, container configuration changes, etc. Container network manager 150 may be notified of the occurrence of container lifecycle events from container orchestration engines 140 according to any mechanism supported by container orchestration engines 140, such as events, notifications, messages, etc. Event data that corresponds to the event may specify details about the event, such as the type of event, when the event occurred, and container attribute data, for new or existing containers. For example, the event may specify all of the container attribute data for a new container. For a change to an existing container, the event data may include all of the container attribute data for the container, or just the container attribute data that changed.

In response to detecting a container lifecycle event, container network manager 150 is configured to generate and publish one or more container lifecycle notifications. According to one embodiment, container network manager 150 supports a publish and subscribe mechanism, including for example a queuing mechanism, that may be specific to container supervisors and containers. This allows container supervisors to subscribe to receive, from container network manager 150, container lifecycle notifications pertaining to particular containers. This increases relevancy, reduces the amount of computational and storage resources consumed by container supervisors, and their respective network switches, and reduces network traffic.

Container lifecycle notifications may be in any form and be transmitted using any type of messaging or notification connection or mechanism that may vary depending upon a particular implementation. For example, notifications may be made as Advanced Message Queuing Protocol (AMQP) notifications, REST notifications, etc. A container lifecycle notification may include container attribute data for one or more containers. For example, a container lifecycle notification that was generated in response to an event that created a new container or changed an existing container, the container lifecycle notification may include container attribute data that was included in the event data for the event generated by container orchestration engines 140. Example container attributes include, without limitation, a container name that uniquely identifies a container, a container label (type, category, logical group, etc.), an interface identifier, a virtual local area network (VLAN) identifier, an IP address, an internal portion, an external portion, etc., container state information, etc. A notification may include container attribute data for a single container, or for multiple containers, depending upon a particular implementation.

According to one embodiment, container network manager 150 also maintains container attribute data 152 locally, for example in local storage accessible by container network manager 150. Container network manager 150 provides a user interface that allows user to access to the container attribute data. For example, the user interface may be a Command Line Interface (CLI) that allows a user to issue commands to view container attribute data. The user interface may also be implemented as a Web-based graphical user interface that provide more sophisticated functionality for viewing container attribute data. For example, the user interface may allow a user to view a list of containers known to container network manager 150 and the user may select different ways of viewing the containers, e.g., by network switch, etc. A user may select a graphical user interface control to view the corresponding container attribute data for a selected container, or group of containers. The user interface may also allow users to update container attribute data and export container attribute data, for example, to network management software or other entities.

III. Obtaining Container Attribute Data Via Container Lifecycle Notifications Network switches 120, 130 obtain container attribute data from container network manager 150, without having to know anything about the particular container orchestration engines 140 being used. According to an embodiment, container supervisors 122, 132 obtain container attribute data from container network manager 150 via a subscription model. More specifically, container supervisors 122, 132 are configured to subscribe to container lifecycle notifications generated by container network manager 150. This creates a messaging connection or messaging bus, between container network manager 150 and network switches 120, 130 that allows network switches 120, 130 to obtain current container attribute data, including data needed to implement container virtual network 180.

Subscribing to container lifecycle notifications generated by container network manager 150 may be accomplished in different ways that may vary depending upon a particular implementation. According to an embodiment, container supervisors 122, 132 are initially configured to use network information, such as an IP address and credentials, for container network manager 150 to establish a subscription. This may include generating and transmitting, to container network manager 150, a setup or subscription request that conforms to an API supported by container network manager 150.

According to one embodiment, in response to a particular container supervisor on a network switch registering with, or establishing a subscription with, container network manager 150, container network manager 150 sends the container attribute data for all of the containers connected to ("below") the particular network switch. The initial container attribute data for all of the containers may be provided using the publishing mechanism supported by container network manager 150, or by other means. For example, the container attribute data for all of the containers may be provided via one or more notification messages, or one or more other types of messages. Thereafter, container supervisor 122 receives container lifecycle notifications that include only container attribute data for new containers or updated containers, i.e., incremental notifications. For example, a subsequent notification may specify a new IP address or a new port number that was changed for a particular container. This helps minimize the amount of computational and storage resources consumed by network switches and reduces overall network traffic. Container supervisors may update subscriptions over time, for example, by adding, changing, or deleting a subscription.

In some situations, network switches 120, 130 may receive container lifecycle notifications for containers that are not necessarily directedly connected to, i.e., not below, the respective network switches. For example, container supervisor 122 may receive container lifecycle notifications for containers 162, while container supervisor 132 may receive container lifecycle notifications for containers 172. In these situations, container supervisors 122, 132 have received container attribute data for containers for which their respective network switches 120, 130 will not be performing any network functionality. To address this situation, according to an embodiment, container supervisors 122, 132 are configured to filter container lifecycle notifications based on network device connectivity determined, for example, using Link Layer Discovery Protocol (LLDP)-based topology discovery. More specifically, since container supervisors 122, 132 are aware of the computing devices, e.g., servers, and/or containers connected below the associated network switches 120, 130, container supervisors 122, 132 process only container lifecycle notifications that are related to computing devices 160, 170 and/or containers connected below the associated network switch 120, 130. Thus, container supervisor 122 would only process container lifecycle notifications that are related to computing device 160, while container supervisor 132 would only process container lifecycle notifications that are related to computing device 170.

As an alternative to receiving container lifecycle notifications for all containers connected to a network switch, container supervisors 122, 132 may specify particular containers for which the container supervisors 122, 132 are to receive notifications. For example, container supervisors 122, 132 may subscribe to notifications for containers connected to their respective switches 120, 130. This may be done using a subscription request or a configuration command, that specifies one or more particular containers, e.g., by container name or identification, for which container lifecycle notifications are to be received by a particular network switch. This more granular approach allows notifications to be tailored to particular containers to further reduce the computational and storage burdens on the particular network switch, as well as reduce the amount of network traffic attributable to the notifications. Container supervisors 122, 132 may use a discovery mechanism, such as the LLDP for dynamic discovery of server-to-switch port mapping, to discover computing devices 160, 170 and, in certain examples, containers 162, 172 hosted by computing devices 160, 170.

IV. Updating Network Switch Configuration Data

Once a container supervisor has received a container lifecycle notification from container network manager 150, the container supervisor extracts the container attribute data from the container lifecycle notification and updates container configuration data on the network switch with the container attribute data. This may include adding container attribute data for new containers and updating container attribute data for existing containers. For example, after receiving the container attribute data for all of the containers connected to a particular network switch in response to a particular network switch registering with and/or establishing a subscription with container network manager 150, container network manager 150 updates local container configuration data in its respective network switch. This may include, for example, container supervisor 122 adding and populating a new row in a hardware table, such as a routing table and/or a forwarding table, with the container attribute data for a new container, and/or revising the container attribute data in a hardware table that may exist for an existing container, for example, by issuing one or more network switch commands. The container configuration data may include data that is used by a network switch and any applications executing on the network switch. Container attribute data may include, for example, a container label, an interface identifier, a VLAN identifier, an IP address, an internal port, an external port, a Media Access Control (MAC) address, a Tenant identifier, an Application identifier, an Image, etc., or any other data, or any combination of the foregoing, which allows network switches 120, 130 to perform networking functionality with respect to containers 162, 172. Embodiments do not require that all of the container attribute data received from container network manager 150 be used on any particular network switch, and any portion, or all, of the container attribute data may be used, depending upon a particular implementation.

Figure 3:
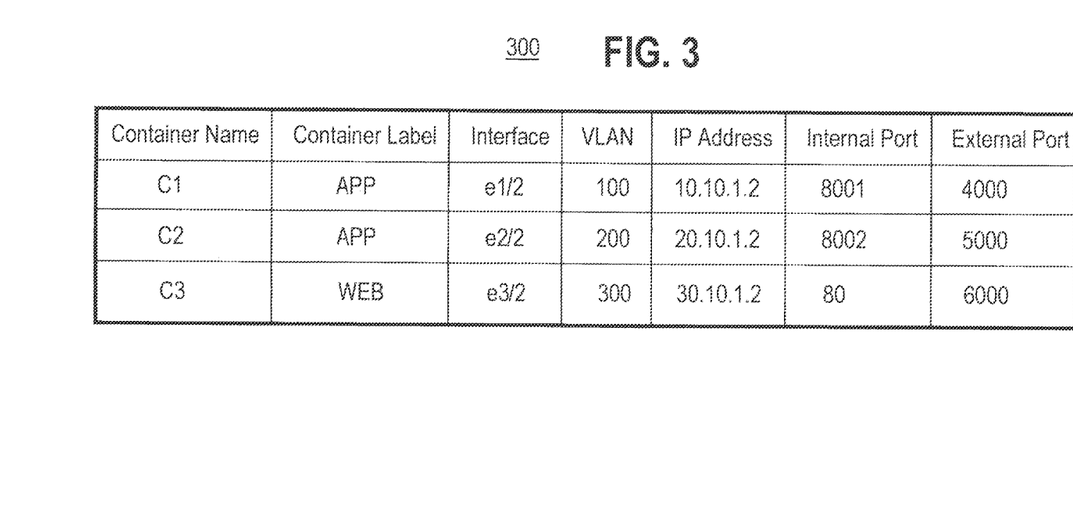
FIG. 3 is a table that depicts example container attribute data obtained via container lifecycle notifications and includes a container name, a container label, an interface identifier, a VLAN identifier, an IP address, an internal port, and an external port.

FIG. 3 is a table 300 that depicts example container attribute data obtained via container lifecycle notifications and includes a container name, a container label, an interface identifier, a VLAN identifier, an IP address, an internal port, and an external port. Each row of table 300 corresponds to a particular container and specifies the container attribute values for the particular container. For example, the first row of table 300 corresponds to a container having the container name "C1," a container label "APP," an interface identification of "e1/2," a VLAN value of "100," an IP address of "10.10.1.2," an internal port number of "8001," and an external portion number of "4000." Embodiments are not limited to the example networking information depicted in FIG. 3 and the particular networking information used may vary depending upon a particular implementation. In addition, although embodiments are depicted in the figures and described herein in the context of the IPv4 protocol, this is done for explanation purposes only, and embodiments are not limited to the IPv4 protocol and are applicable to other protocols, such as the IPv6 protocol.

According to one embodiment, container supervisors are configured to make one or more applications aware of container attribute data, for example, container attribute data for a new container or revised container attribute data for an existing container. This may be accomplished in different ways that may vary depending upon a particular implementation and embodiments are not limited to any particular method. A container supervisor may itself update data maintained by applications on a network switch and then notify a corresponding application that the data has been updated. For example, container supervisor 122 updates a particular data table used by a particular application from switch applications 124, and then notifies the particular application that the particular data table has been updated with new or revised container attribute data. Alternatively, a container supervisor may notify an application that new or revised container attribute data is available. In the prior example, container supervisor 122 makes the particular application aware that new or revised container attribute data is available. This may be done, for example, by container supervisor 122 generating an event or generating and transmitting a message. As another alternative, container supervisors may use a publish and subscribe mechanism to make applications aware of new or revised container attribute data. For example, one or more applications on network switch 120 subscribe to receive notifications from container supervisor 122. Subscriptions may be made on a per container basis. After container supervisor 122 updates switch configuration data 126 in response to a notification received from container network manager 150 pertaining to a particular container, container supervisor 122 generates and publishes a notification to the applications that subscribed to receive notifications pertaining to the particular container. When an application receives a notification from container supervisor 122, the application extracts container attribute data from the notification and updates the local data used by the application. This approach allows applications to always have current container attribute data, e.g., current and correct networking parameters, such as an interface identification, a VLAN, an IP address, an internal port number, an external port number, etc., which allows them to function correctly without requiring manual intervention to correct the networking parameters.

Figure 4:
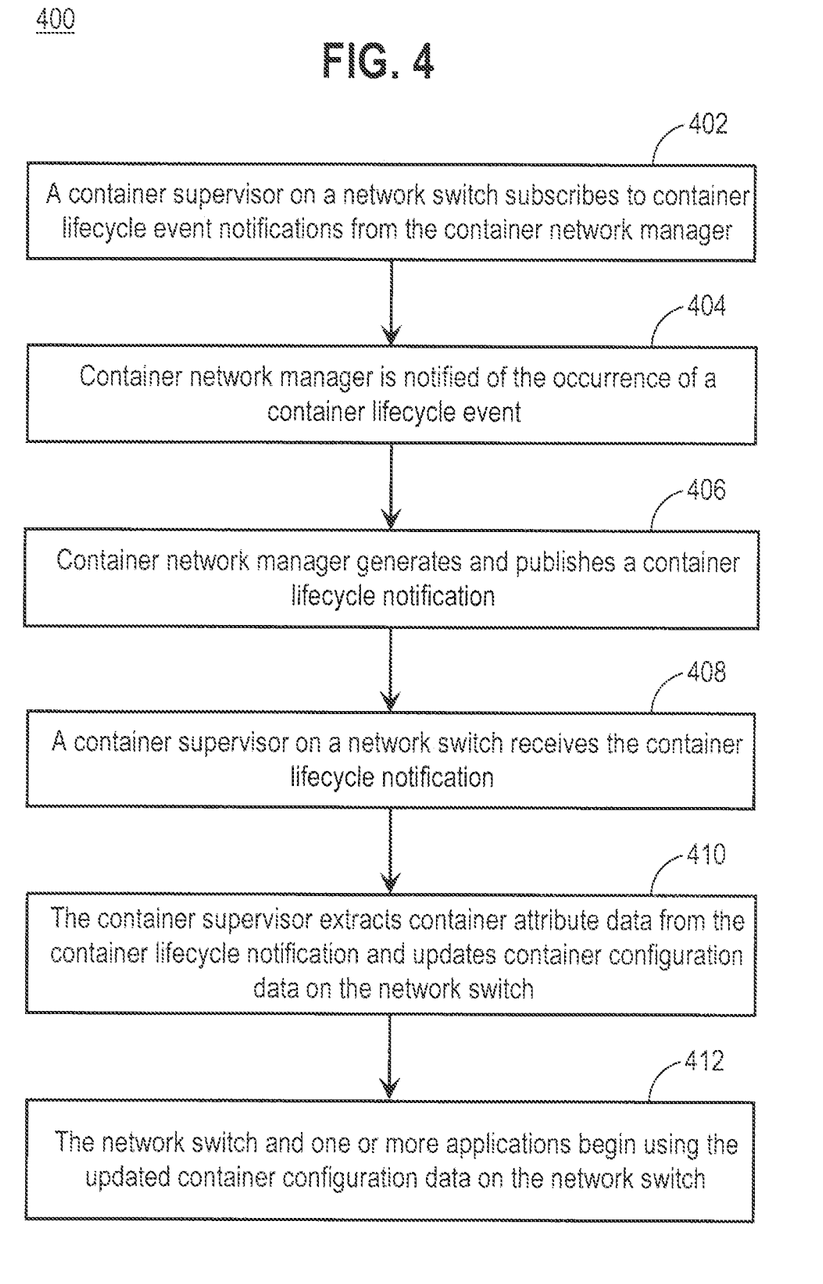
FIG. 4 is a flow diagram that depicts an approach for configuring container attribute data on network switches to enable networking functionality.

FIG. 4 is a flow diagram 400 that depicts an approach for configuring container attribute data on network switches to enable networking functionality, according to an embodiment. The approach assumes that container orchestration engines 140, container network manager 150, and container supervisor 122 have been instantiated and are executing.

In step 402, a container supervisor on a network switch subscribes to notifications from the container network manager. For example, container supervisor 122 subscribes to container lifecycle event notifications from container network manager 150. As previously described herein, the subscription may be for notifications for all containers, or for specified containers.

In step 404, the container network manager is notified of the occurrence of a container lifecycle event. For example, container network manager 150 is notified by container orchestration engines 140 that a container lifecycle event has occurred with respect to a particular container from containers 162. As previously described herein, event data for the event may include new or revised container attribute data when a container is created or changed.

In step 406, the container network manager generates and publishes a container lifecycle notification to all container supervisors that are currently subscribed to receive events for the particular container. In the present example, it is presumed that container supervisor 122 is subscribed to receive notifications for the particular container. Thus, container network manager 150 generates and publishes a container lifecycle notification to container supervisor 122.

In step 408, a container supervisor on a network switch receives the container lifecycle notification. For example, container supervisor 122 receives the container lifecycle notification for the particular container published by container network manager 150.

In step 410, the container supervisor extracts container attribute data from the container lifecycle notification and updates container configuration data on the network switch. For example, container supervisor 122 extracts container attribute data from the container lifecycle notification and updates the container configuration data for the container contained in switch configuration data 126 on network switch 120. As previously described herein, this may include updating hardware tables using by network switch 120 to forward network traffic to the particular container, as well as data used by applications executing on network switch 120. In the situation where the event is a deletion of the particular container, then container supervisor 122 updates switch configuration data 126 to remove the particular event, e.g., from the hardware tables and data used by applications.

In step 412, the network switch and one or more applications being using the updated container configuration data on the network switch, as described in more detail hereinafter.

V. Using Container Attribute Data

The approaches described herein provide visibility to containers that are connected to network switches 120, 130, even when the network switch is just a pass-through, e.g., in a situation where the computing device-to-computing device communication uses VXLAN or some other tunnel.

In addition, network switches 120, 130 may use container attribute data extracted from container lifecycle notifications to configure networking functionality for containers 162, 172 on container virtual network 180. For example, the container attribute data updated in the container configuration data of network switches 120, 130 may be used to forward network traffic to and from containers 162, 172 via container virtual network 180. If network switch 120, 130 is not a pass-through element, the computing device may be required to obtain a VLAN/SVI or network resource that is configured dynamically to aid in switching the traffic to and from containers 162, 172. This functionality may be dynamically triggered based on the container lifecycle notifications to ensure that resources are provisioned/de-provisioned, thereby ensuring optimal usage of resources without any manual intervention.

In some situations, some provisioning of network switches 120, 130 may be needed to ensure that containers 162, 172 on computing devices 160, 170, respectively, are able to communicate with one another. This may include configuring networking policies on network switches 120, 130 that may be triggered by container lifecycle notifications that are sent to container supervisors 122, 132. For example, container lifecycle notifications may trigger dynamic/automatic provisioning of overlay networks and networking policies on network switches 120, 130. Container network manager notifications 152 may trigger network switches 120, 130 to configure any of a number of different network policies, such as the creation of virtual local area networks (VLANs), ACLs, or any other network policy that facilitates container-to-container communication.

In addition to the foregoing, operations that rely upon accurate and current networking configuration data for containers may be implemented on network switches 120, 130 without having to manually configure network switches 120, 130, and in a container interface/IP address/port number independent manner. For example, suppose that switch applications 124 include a network traffic monitoring application that is implemented, for example, as an OS level application on network switch 120. The network traffic monitoring application may directly use the container configuration data stored at network switch 120 by container supervisor 122. Alternatively, the network traffic monitoring application may query container supervisor 122 to obtain container configuration data for one or more containers, and then update and maintain its own container configuration data. For example, the network monitoring application may query container supervisor 122 for all available container configuration data and populate its own configuration data. This allows network-independent configuration data to be translated into network-dependent configuration data. Thereafter, the container configuration data is incrementally updated by container supervisor 122 when new or revised container attribute data is available. The network traffic monitoring application obtains the new or revised container attribute data from container supervisor 122 and updates its own container configuration data. As another alternative, the network monitoring application may request from container supervisor a subset of container attribute data.

Figure 5:
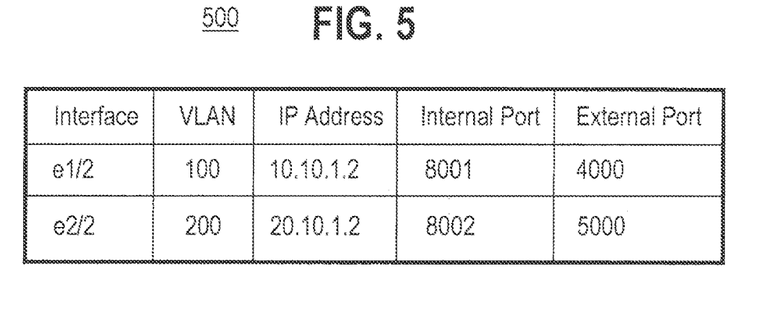
FIG. 5 is a block diagram that depicts an example table maintained by a network traffic monitoring application.

FIG. 5 is a block diagram that depicts an example table 500 maintained by a network traffic monitoring application. In this example, table 500 includes container attribute data for the containers from table 300 of FIG. 3 that have the particular container attribute value of "APP" for the container attribute "Container Label." Note that the attribute value of "APP" is used for explanation purposes only, and the particular attribute value used for the container attribute "Container Label" may vary depending upon a particular implementation. For example, an attribute value may be the name of a business organization, group, logical entity, etc. In this example, the network monitoring application obtains, from container supervisor 122, container attribute data for containers having the container attribute value of "APP" for the container attribute "Container Label." The container attribute value of "APP" for the container attribute "Container Label" may be specified, for example, by a user of the network monitoring application, e.g., via configuration data for the network monitoring application, or via a user interface. The use of the container attribute "Container Label" allows a user to specify multiple containers that have some association and that are to be processed by a particular application, without having to specify each individual container by name or other identifying information. For example, a user may be interested in performing network monitoring only on containers that have the container attribute value of "APP" for the container attribute "Container Label." This abstraction allows policies and processes to be implemented at a more abstract level, independent of the underlying network-specific information for containers, such as interface ID, IP address, VLAN number, port number, etc. This provides scalability and reduces maintenance and errors attributable to manual updates.

Once an application has populated its local data with current container attribute data, the application generates and/or modifies ACLs and service policies using the current container attribute data. The application then completes any internal configuration with the updated ACLs, service policies, etc., and applies the updated policies on the interface. One or more processes, such as an ACL management process and a service policy management process, then begin using the updated ACLs, service policies, etc. In the network monitoring example above, the network monitoring application starts monitoring network traffic for containers having the container attribute value of "APP" for the container attribute "Container Label," which in the present example is containers "C1" and "C2." Similarly, a policy-based routing application begins operating using the current container attribute data.

Figure 6:
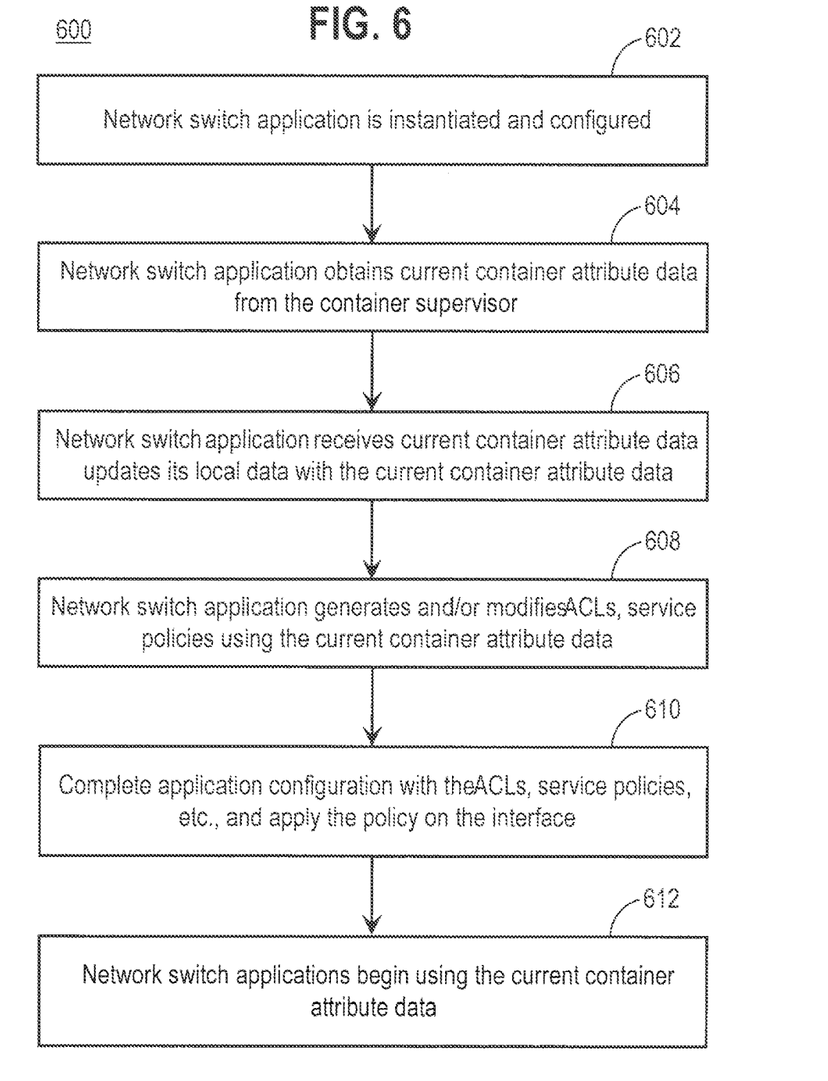
FIG. 6 is a flow diagram that depicts an approach for using current container attribute data on network switches.

FIG. 6 is a flow diagram 600 that depicts an approach for using current container attribute data on network switches, according to an embodiment. In step 602, a network switch application is instantiated and configured. For example, a network monitoring application is instantiated and configured on network switch 120. In step 604, the network switch application obtains current container attribute data from a container supervisor on the network switch. For example, the network monitoring application obtains current container attribute data for containers 162 from container supervisor 122 using a communication method supported by container supervisor 122, such as a receiving a notification via a subscription, generating and transmitting a query to container supervisor 122, etc.

In step 606, the network switch application receives current attribute data and updates its local data with the current container attribute data. For example, the network monitoring application receives current container attribute data from container supervisor 122 and updates its local data. This may include a subset of container attribute data having a particular container attribute data value, for example, for containers having a "Container Label" attribute value of "APP." This provides a translation of network-independent information into network-dependent information.

In step 608, the network switch application generates and/or modifies ACLs, service policies, etc., using the current container attribute data. For example, the network monitoring application generates and/or modifies ACLs, service policies, etc. on network switch 120. In step 610 the application configuration with the ACLs, service policies, etc., is completed and are applied on the interface. For example, configuration of the network monitoring application is completed and one or more processes, such as an ACL management process and a service policy management process, then begin using the updated ACLs, service policies, etc. In step 610, the network switch and network switch applications begin using the current container attribute data. For example, the network monitoring application starts monitoring network traffic for containers having the container attribute value of "APP" for the container attribute "Container Label," which in the present example is containers "C1" and "C2." Similarly, a policy-based routing application begins operating using the current container attribute data.

VI. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
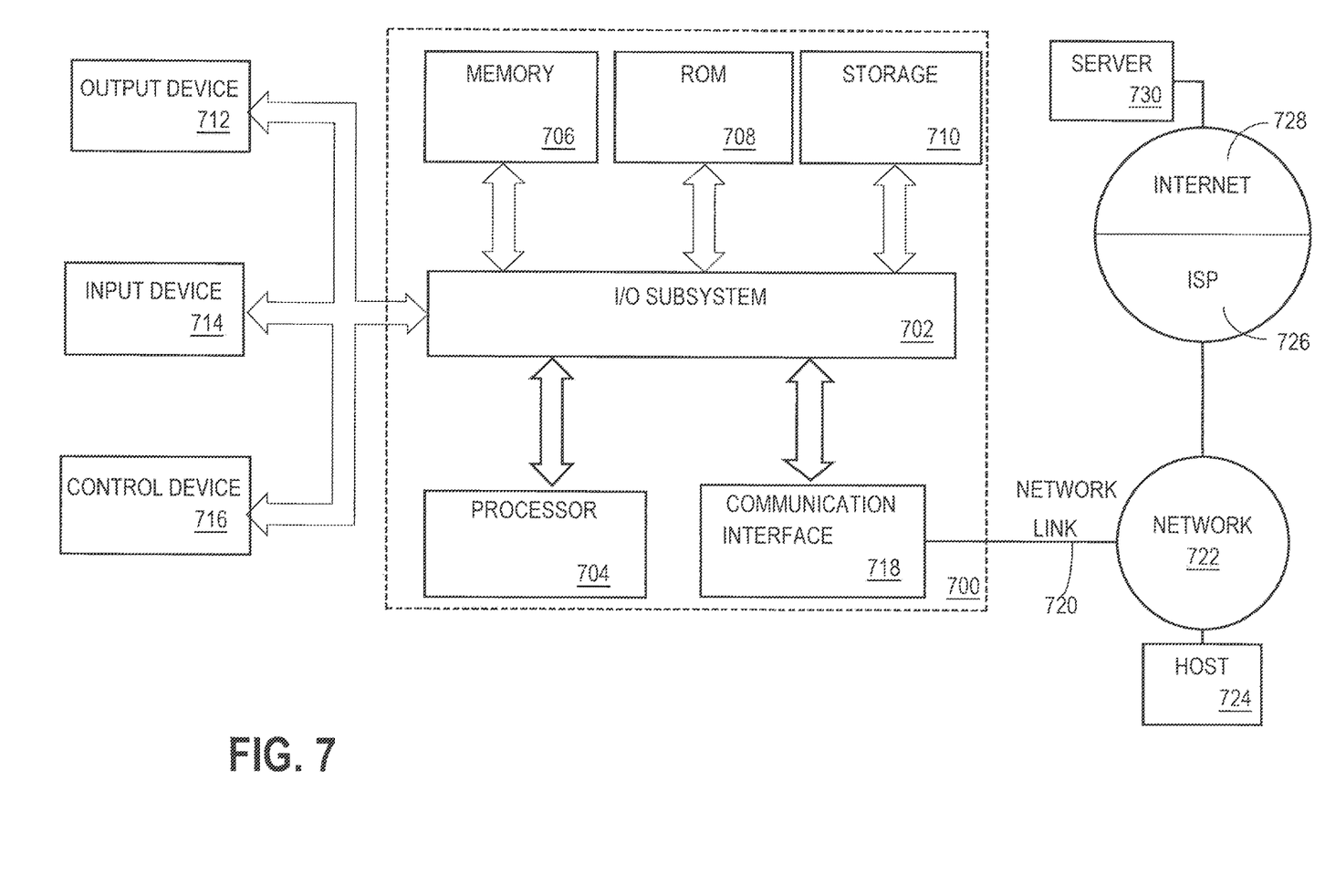
FIG. 7 is a block diagram of a computer system on which embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Figure 8:
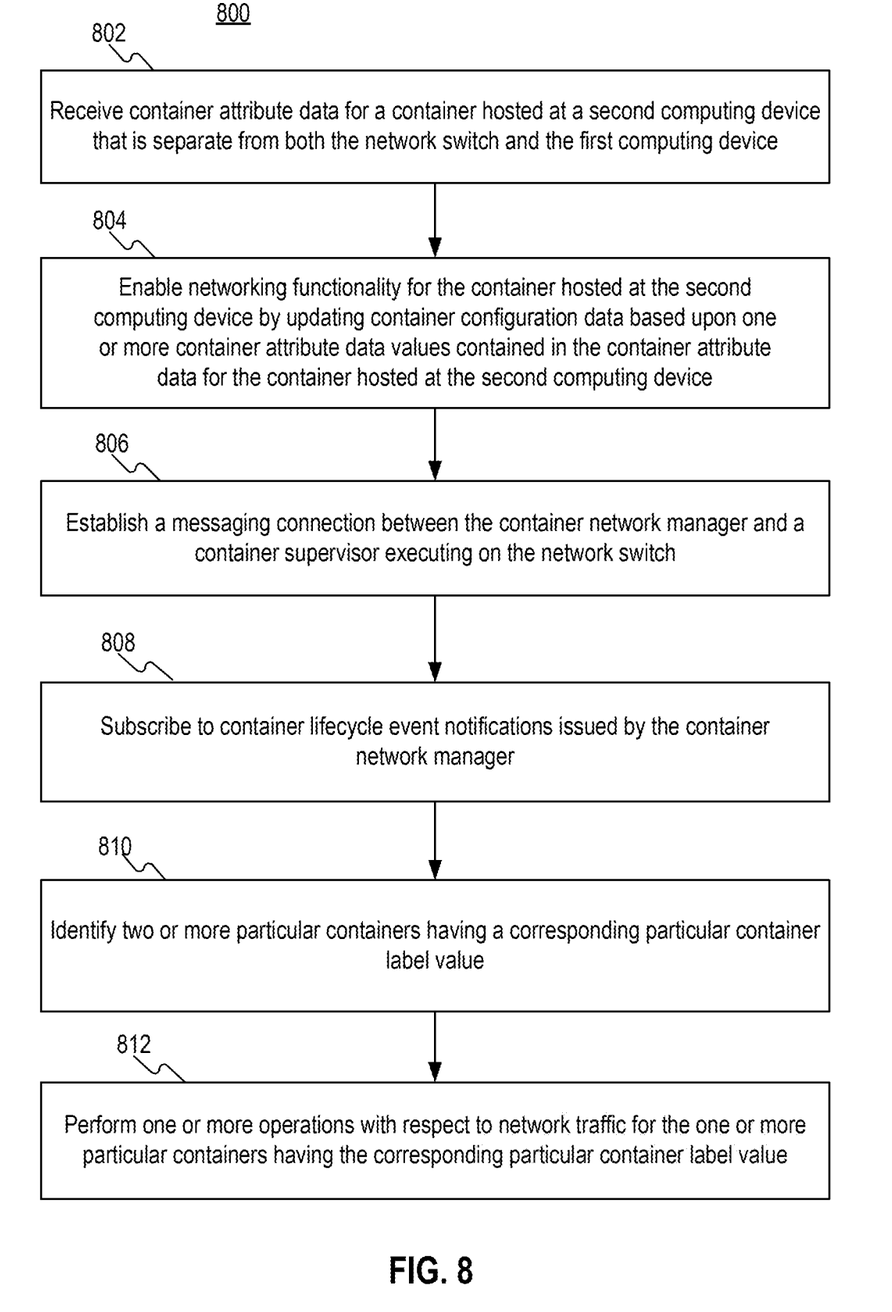
FIG. 8 is a flow diagram that depicts an approach for configuring container attribute data on network switches to enable networking functionality.

FIG. 8 is a flow diagram 800 that depicts an approach for configuring container attribute data on network switches to enable networking functionality, according to an embodiment. In step 802, embodiments of the disclosure may receive container attribute data for a container hosted at a second computing device that is separate from both a network switch and a first computing device. For example, the container attribute data may be received at the network switch from a container network manager that executes on the first computing device that is both separate from the network switch and communicates with one or more container orchestration engines.

In step 804, embodiments of the disclosure may enable networking functionality for the container hosted at the second computing device by updating container configuration data based upon one or more container attribute data values contained in the container attribute data for the container hosted at the second computing device. For example, this may be done at the network switch. Enabling networking functionality for the container hosted at the second computing device includes the network switch using the one or more container attribute data values to forward network traffic from the network switch to the container hosted at the second computing device. Updating container configuration data based upon one or more container attribute data values contained in the container attribute data for the container hosted at the second computing device may include adding network-specific data to non-network-specific data in the container configuration data. The container network manager may be configured to communicate with a container network agent executing on the second computing device that hosts that container. The one or more container attribute data values may include one or more of an interface identifier, an IP address, a port number, or one or more other container attribute values. Updating container configuration data may include updating one or more hardware tables on the network switch to include the one or more container attribute data values contained in the container attribute data for the container hosted at the second computing device.

In step 806 a messaging connection may be established between the container network manager and a container supervisor executing on the network switch. In step 808, container lifecycle event notifications may be subscribed to that may be issued by the container network manager. For example, the container lifecycle event notifications may be subscribed to by the container supervisor executing on the network switch. The attribute data for the container hosted at the second computing device received at the network switch may be contained in one or more container lifecycle event notifications received by the container supervisor executing on the network switch. Subscribing, by the container supervisor executing on the network switch, to container lifecycle event notifications issued by the container network manager may include: i) discovering, by the container supervisor executing on the network switch, one or more containers connected to the network switch; and ii) subscribing, by the container supervisor executing on the network switch, to container lifecycle event notifications issued by the container network manager for container lifecycle event notifications related to the one or more containers connected to the network switch.

In step 810, two or more particular containers may be identified having a corresponding particular container label value. For example, the two or more particular containers may be identified by an application executing on the network switch examining data contained in the container configuration data. In step 812, one or more operations may be performed with respect to network traffic for the one or more particular containers having the corresponding particular container label value. For example, the one or more operations may be performed at the network switch, by the application executing on the network switch.

What is claimed is:

1. A computer-implemented method comprising:
   receiving, at a network switch from a container network manager that executes on a first computing device that is both separate from the network switch and communicates with one or more container orchestration engines, container attribute data for a container hosted at a second computing device that is separate from both the network switch and the first computing device;

at the network switch, enabling networking functionality for the container hosted at the second computing device by updating container configuration data based upon one or more container attribute data values contained in the container attribute data for the container hosted at the second computing device.

2. The computer-implemented method of claim 1, further comprising:

establishing a messaging connection between the container network manager and a container supervisor executing on the network switch, subscribing, by the container supervisor executing on the network switch, to container lifecycle event notifications issued by the container network manager, and wherein the attribute data for the container hosted at the second computing device received at the network switch is contained in one or more container lifecycle event notifications received by the container supervisor executing on the network switch.

3. The computer-implemented method of claim 2, wherein subscribing, by the container supervisor executing on the network switch, to container lifecycle event notifications issued by the container network manager includes:

discovering, by the container supervisor executing on the network switch, one or more containers connected to the network switch, and subscribing, by the container supervisor executing on the network switch, to container lifecycle event notifications issued by the container network manager for container lifecycle event notifications related to the one or more containers connected to the network switch.

4. The computer-implemented method of claim 1, further comprising:

identifying, by an application executing on the network switch examining data contained in the container configuration data, two or more particular containers having a corresponding particular container label value; and performing at the network switch, by the application executing on the network switch, one or more operations with respect to network traffic for the one or more particular containers having the corresponding particular container label value.

5. The computer-implemented method of claim 1, wherein enabling networking functionality for the container hosted at the second computing device includes the network switch using the one or more container attribute data values to forward network traffic from the network switch to the container hosted at the second computing device.

6. The computer-implemented method of claim 1, wherein updating container configuration data based upon one or more container attribute data values contained in the container attribute data for the container hosted at the second computing device includes adding network-specific data to non-network-specific data in the container configuration data.

7. The computer-implemented method of claim 1, wherein the container network manager is configured to communicate with a container network agent executing on the second computing device that hosts that container.

8. The computer-implemented method of claim 1, wherein the one or more container attribute data values include one or more of an interface identifier, an IP address, a port number, or one or more other container attribute values.

9. The computer-implemented method of claim 1, wherein updating container configuration data includes updating one or more hardware tables on the network switch to include the one or more container attribute data values contained in the container attribute data for the container hosted at the second computing device.

10. One or more non-transitory computer-readable media storing instructions which, when processed by one or more processors, cause:

receiving, at a network switch from a container network manager that executes on a first computing device that is both separate from the network switch and communicates with one or more container orchestration engines, container attribute data for a container hosted at a second computing device that is separate from both the network switch and the first computing device;

at the network switch, enabling networking functionality for the container hosted at the second computing device by updating container configuration data based upon one or more container attribute data values contained in the container attribute data for the container hosted at the second computing device.

11. The one or more non-transitory computer-readable media of claim 10, further comprising additional instructions which, when processed by the one or more processors, cause:

establishing a messaging connection between the container network manager and a container supervisor executing on the network switch, subscribing, by the container supervisor executing on the network switch, to container lifecycle event notifications issued by the container network manager, and wherein the attribute data for the container hosted at the second computing device received at the network switch is contained in one or more container lifecycle event notifications received by the container supervisor executing on the network switch.

12. The one or more non-transitory computer-readable media of claim 11, wherein subscribing, by the container supervisor executing on the network switch, to container lifecycle event notifications issued by the container network manager includes:

discovering, by the container supervisor executing on the network switch, one or more containers connected to the network switch, and subscribing, by the container supervisor executing on the network switch, to container lifecycle event notifications issued by the container network manager for container lifecycle event notifications related to the one or more containers connected to the network switch.

13. The one or more non-transitory computer-readable media of claim 10, further comprising additional instructions which, when processed by the one or more processors, cause:

identifying, by an application executing on the network switch examining data contained in the container configuration data, two or more particular containers having a corresponding particular container label value; and performing at the network switch, by the application executing on the network switch, one or more operations with respect to network traffic for the one or more particular containers having the corresponding particular container label value.

14. The one or more non-transitory computer-readable media of claim 10, wherein enabling networking functionality for the container hosted at the second computing device includes the network switch using the one or more container attribute data values to forward network traffic from the network switch to the container hosted at the second computing device.

15. The one or more non-transitory computer-readable media of claim 10, wherein updating container configuration data based upon one or more container attribute data values contained in the container attribute data for the container hosted at the second computing device includes adding network-specific data to non-network-specific data in the container configuration data.

16. The one or more non-transitory computer-readable media of claim 10, wherein the container network manager is configured to communicate with a container network agent executing on the second computing device that hosts that container.

17. The one or more non-transitory computer-readable media of claim 10, wherein the one or more container attribute data values include one or more of an interface identifier, an IP address, a port number, or one or more other container attribute values.

18. The one or more non-transitory computer-readable media of claim 10, wherein updating container configuration data includes updating one or more hardware tables on the network switch to include the one or more container attribute data values contained in the container attribute data for the container hosted at the second computing device.

19. An apparatus comprising:
one or more processors; and
one or more memories storing instructions which, when processed by one or more processors, cause:
receiving, at a network switch from a container network manager that executes on a first computing device that is both separate from the network switch and communicates with one or more container orchestration engines, container attribute data for a container hosted at a second computing device that is separate from both the network switch and the first computing device; and
at the network switch, enabling networking functionality for the container hosted at the second computing device by updating container configuration data based upon one or more container attribute data values contained in the container attribute data for the container hosted at the second computing device.

20. The apparatus of claim 19, wherein the one or more memories further store additional instructions which, when processed by the one or more processors, cause:
establishing a messaging connection between the container network manager and a container supervisor executing on the network switch,
subscribing, by the container supervisor executing on the network switch, to container lifecycle event notifications issued by the container network manager, and
wherein the attribute data for the container hosted at the second computing device received at the network switch is contained in one or more container lifecycle event notifications received by the container supervisor executing on the network switch.

* * * * *